April 18, 1950   F. A. STECKER ET AL   2,504,746
HAND CULTIVATING TOOL
Filed July 8, 1946
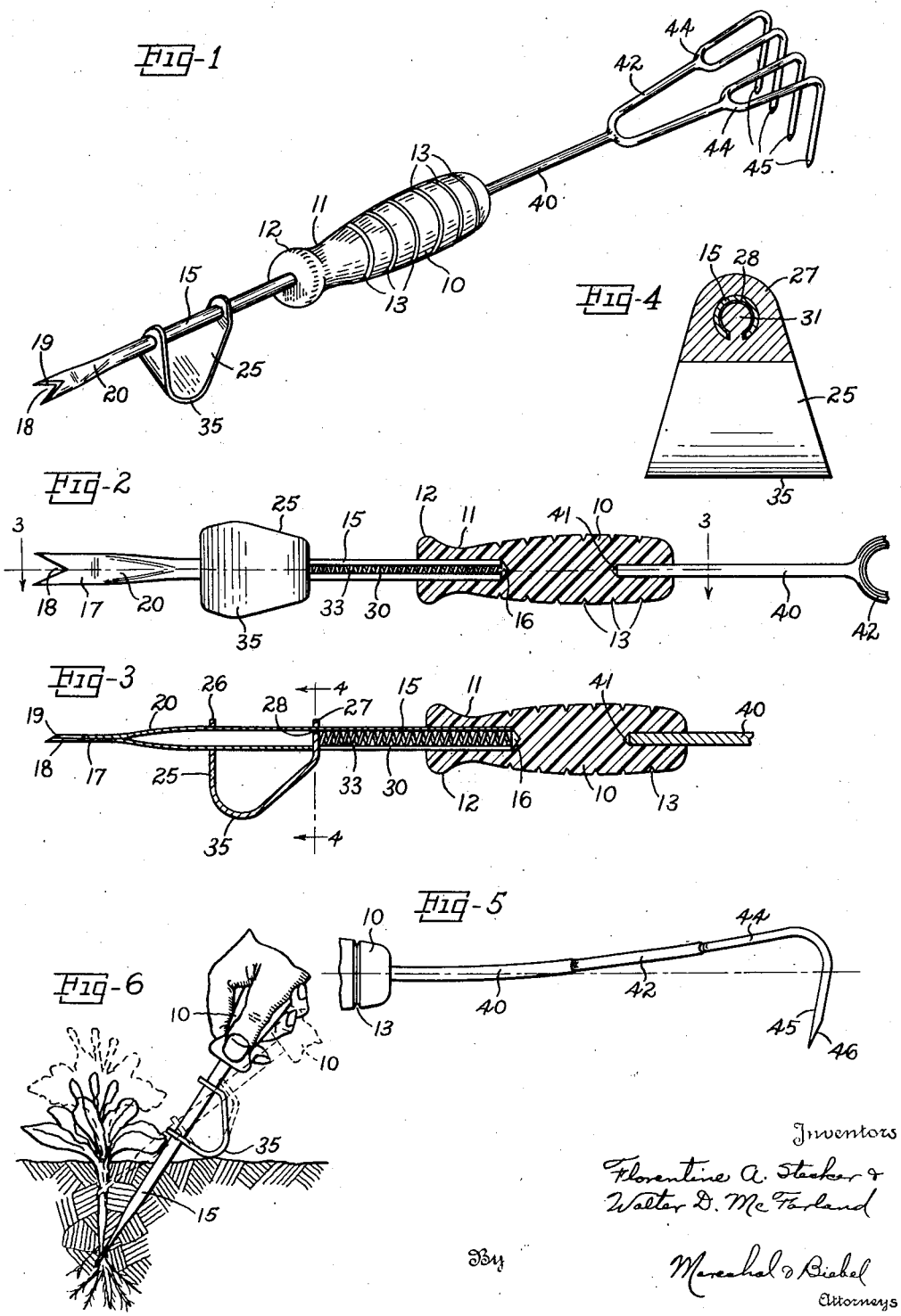

Patented Apr. 18, 1950

2,504,746

UNITED STATES PATENT OFFICE 2,504,746

HAND CULTIVATING TOOL

Florentine A. Stecker and Walter D. McFarland, Greenville, Ohio

Application July 8, 1946, Serial No. 682,006

3 Claims. (Cl. 254—132)

This invention relates to a hand tool for the weeding and cultivation of gardens and lawns.

One of the principal objects of the invention is to provide a garden and lawn tool of simple and strong construction which includes at one side of the handle a cutter portion for severing the roots of weeds and the like below the level of the ground and includes also at the opposite side of the handle a rake or cultivator portion for loosening and uprooting the side and surface roots of foreign vegetation having its main roots severed by the cutter portion.

Another object is to provide a garden and lawn tool having a cutter portion designed for easy penetration of the ground to a considerable depth to cut off and uproot undesired vegetation.

It is also an object of the invention to provide such a garden and lawn tool having a fulcrum for leverage by the cutter to uproot undesired vegetation, which fulcrum is automatically adjusted with respect to the cutter in accordance with the depth to which the cutter penetrates the ground.

A further object is to provide a garden and lawn tool as outlined which is particularly adapted for use in the care of lawns to remove crab grass, dandelions, plantain and like undesired vegetation commonly found in lawns.

Other objects and advantages of the invention will be apparent from the following description, the accompanying drawings, and the appended claims.

In the drawing, in which like characters of reference designate like parts throughout:

Fig. 1 is a view in perspective showing a garden and lawn tool constructed in accordance with the invention;

Fig. 2 is a bottom view of a portion of the tool shown in Fig. 1, with the handle in section to illustrate internal construction;

Fig. 3 is a view in vertical section through the weed extracting portion of the tool shown in Fig. 1, the view being taken substantially on the line 3—3 in Fig. 2;

Fig. 4 is a transverse section taken on the line 4—4 in Fig. 3;

Fig. 5 is a view in side elevation of the cultivating or rake portion of the tool shown in Fig. 1; and Fig. 6 is a somewhat diagrammatic view illustrating the use of the weed severing and extracting portion of the tool shown in Fig. 1.

The preferred embodiment of the invention shown in the drawing is designed for ready manipulation by one hand of the operator, and a convenient handle 10 is accordingly provided disposed approximately midway between the ends of the tool. As shown, the handle may be satisfactorily formed of molded plastic material such, for example, as cellulose acetate, cellulose acetate butyrate, ethyl cellulose or the like. The main body of handle 10 is formed to fit within the hand of the user, and a relatively deep peripheral groove 11 is formed near one end of the handle leaving a shoulder 12 adjacent the handle end which serves somewhat as a hilt in use. This handle member may be readily formed with a suitable dye or other coloring matter therein to give an attractive appearance to the tool, and it may be provided also with a plurality of peripheral grooves 13 to facilitate gripping thereof, and these grooves may be colored in a contrasting color with the remainder of the handle to enhance further the general attractiveness of the device.

The weed severing and extracting portion of the tool includes a rod member 15 having a forced fit in a complementary bore 16 in the end of handle 10 adjacent hilt portion 12, as shown particularly in Figs. 2 and 3. This rod member 15 is shown as hollow, being formed of seamless or welded tubular material, and at its outer end it is flattened or pinched together to provide a portion 17 substantially parallel and coincident with the central axis of the tube. The outer end of this flattened tube portion 17 is cut out to provide a V-shaped cutter portion 18, the sides of which are chamfered at 19 to provide sharp cutting edges. The portion 20 of the tubular member intermediate the flattened cutter portion 17 and the remainder of the tube is tapered or faired smoothly, as shown, to facilitate penetration of the ground by the tube with minimum interference from closely packed earth or the like. This faired portion also reinforces the cutter tip against possible deflection or bending when the device is used as a lever to uproot severed foreign vegetation.

The invention also provides an automatically adjustable fulcrum to cooperate with the above described tube and cutter in uprooting severed weeds and the like. As shown, a strap member 25 is formed in a generally channeled shape and mounted for sliding fore and aft movement on tube 15. The outer end 26 of this strap has a circular hole therethrough adapted to receive the tube 15. The inner end 27 of strap 25 is also provided with a slot 28 which, however, is partially annular rather than circular, a tab portion 31 of the material of the strap remaining within the outline of the slot as shown in Fig. 4. The inner end of tube 15 is provided with a slot 30 extending parallel to its axis and giving to this portion of the tube a shape in cross section complementary to that of the annular slot 28 in strap 25, providing for the insertion of this end of the tube in slot 28.

With this construction, the tab-like portion 31 at strap end 27 which is formed by the cutting of annular slot 28 fits within the interior of the slotted portion of the tube 15 and abuts the inner end of the slot 30 to provide a stop limiting the outward sliding movement of the strap 25 on the tube 15. A coil spring 33 is positioned within this slotted portion of tube 15 and is confined between the tab 31 and the inner end of the bore 16 in handle 10 which receives tube 15. This construction thus provides at the outer, rolled portion 35 of strap 25 a fulcrum for tube 15 spaced laterally from the axis of the tube and which is automatically adjustable axially in accordance with the depth to which the cutter portion 17 of the tube penetrates the ground in the severing and removal of foreign vegetation, as will be described.

A rod member 40 is inserted in the opposite end of handle 10 from tube member 15, as by a similar forced fit in a complementary bore 41 in the handle. A U-shaped rod member 42 is secured as by welding or brazing to the outer end of this rod 40, and a pair of similar U-shaped rod members 44 are similarly secured to the outer ends of the U-shaped member 42 and are curved over to provide four rake teeth 45. As shown, the rod 40 and the U-shaped members secured thereto are curved upwardly with respect to the central axis of the tool as a whole, and the teeth 45 are curved in the reverse direction so that they form an acute angle with respect to the remainder of this portion of the tool and intersect the projected central tool axis. This angular relationship provides for holding the tool at a comfortable and proper functional angle when raking or otherwise cultivating with this part of the tool. The ends of these rake teeth 45 are chamfered at 46, at a relatively sharp angle to their main axis to provide sharpened points for purposes of cultivation and the like.

In the use of this tool, the rake end just described may be used for general purposes of cultivation but has been found particularly adaptable to preliminary loosening or uprooting of clinging surface roots of foreign vegetation such as crab grass prior to severing the main trunk roots or stems by means of the cutter portion of the tool. Thereafter, the cutter portion may be used as illustrated in Fig. 6 to uproot or extract the entire weed or other undesired vegetation. As shown, the tube 15 may be readily and effortlessly thrust into the ground at the desired angle until the cutter portion 17—18 severs the main root or roots at a point well below the level of the ground. During this operation, the strap member 25 will be automatically forced upwardly along tube 15 against the expansion pressure of spring 33 as shown. Then by a downward pressure or stroke on handle 10, the upper portion of the tool may be rocked backwards in lever fashion about its fulcrum point 35 to apply an upward force at the cutter point 18 of the tool to the weed and thus cause direct uprooting. Thereafter complete and final removal of the weed or other undesirable foreign vegetation may be accomplished by hand or by reversing the tool terminals and lifting the weed by means of the rake teeth 45, and if this extraction operation leaves a hole of any extent in the surface of the ground, the rolled fulcrum portion 35 of strap 25 may be used to pat the soil back into the hole and level it over.

The invention thus provides a tool having material structural and operational advantages for use in hand cultivation of small areas such as flower beds and particularly for extracting and removing undesired plant vegetation such as crab grass, dandelions, buck corn and plantain which are prevalent in lawns. The cutter portion of the tool readily penetrates well into the ground to cut through the roots of the weed well below the surface of the soil, and the upward lever action at cutter point 18 readily uproots and extracts the cut weed with minimum disturbance of the adjacent soil. If the weed is of such size that the removal of its roots causes a hole, the fulcrum member 25 of the tool operates to good advantage as described in filling and smoothing over such gapping and unsightly holes. The rake end of the tool is designed for particular cooperation with the cutter end both for preliminary loosening and uprooting of the clinging surface roots of the foreign vegetation to be removed and for lifting and removing the vegetation cut and uprooted by the cutter. It should also be noted that handle member 10 of the tool is constructed for special cooperation with both ends of the tool. The hilt portion 12 of the handle is formed for ready support for and engagement with the thumb and forefinger of the user when forcing or thrusting the cutter into the ground, as shown in Fig. 6. Similarly when the rake end of the tool is used, this hilt portion 12 similarly serves as a brace or back stop for the back edge of the hand in using the rake teeth 45 for cultivation or similar draft purposes.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a garden and lawn hand tool of the character described, the combination of a handle member, hollow rod member extending from said handle, a cutter portion at the end of said rod remote from said handle, a fulcrum member mounted for sliding movement on said rod intermediate said handle and cutter and extending laterally from said rod, spring means positioned within said hollow rod, means connecting said spring means with said fulcrum member to effect urging of said fulcrum member by said spring means in the direction of said cutter, and stop means limiting said sliding movement of said fulcrum member, said spring means being yieldable to permit said fulcrum member to slide toward said handle when said cutter portion of said rod is forced into the ground and providing for automatic adjustment of said fulcrum member in direct accordance with the depth of penetration of said cutter.

2. In a garden and lawn hand tool of the character described, the combination of a handle member, a hollow tube member extending from said handle, a cutter portion at the end of said tube remote from said handle, said tube having a slot extending along a portion of the length thereof, a strap member of generally channeled shape mounted for sliding movement fore and aft on said tube intermediate said handle and cutter to provide a fulcrum extending laterally from said rod, one end of said strap member being provided with a partially annular slot therethrough adapted to receive said slotted portion of said tube, the material of said strap within said annular slot extending into said tube and being adapted to abut the outer end of said slot in said tube to limit outward sliding movement of said strap, and a spring positioned within said tube and adapted to engage said material of said strap within said tube to urge said strap and fulcrum in the direction of said cutter, said spring being compressible to permit said strap to slide towards said handle when said cutter portion of said tube is forced into the ground and providing for adjustment of said fulcrum in direct accordance with the depth of penetration of said cutter.

3. In a garden and lawn hand tool of the character described, the combination of a handle member, a hollow tube member extending from said handle, a portion at the outermost end of said tube being flattened substantially parallel to and coincident with the axis of said tube, the outer end of said flattened tube portion being provided with a V-shaped cutting blade adapted to sever roots of weeds and the like below the level of the ground, the portion of said tube intermediate said flattened portion and the remainder of said tube fairing with respect to said flattened portion providing for easy penetration of the ground by said blade portion, a fulcrum member mounted for sliding movement on said tube intermediate said handle and cutter and extending laterally from said tube, spring means positioned within said hollow tube, means connecting said spring means with said fulcrum member to effect urging of said fulcrum member by said spring means in the direction of said blade, and stop means limiting said sliding movement of said fulcrum member, said spring means being yieldable to permit said fulcrum member to slide towards said handle when said blade end of said tube is forced into the ground and providing for automatic fore and aft adjustment of said fulcrum member in direct accordance with the depth of penetration of the ground by said blade.

FLORENTINE A. STECKER.
WALTER D. McFARLAND.

REFERENCES CITED

The following references are of record in the file of this patent:

UNITED STATES PATENTS

| Number | Name | Date |
|---|---|---|
| 74,371 | Jewell | Feb. 11, 1868 |
| 619,325 | Martin | Feb. 14, 1899 |
| 701,451 | Yoder | June 3, 1902 |
| 856,097 | Palmer | June 4, 1907 |
| 1,554,518 | Ostrander | Sept. 22, 1925 |
| 1,573,222 | Coelho | Feb. 16, 1926 |
| 1,857,500 | Davison | May 10, 1932 |
| 2,218,213 | Newman | Oct. 15, 1940 |
| 2,349,621 | Hardman | May 23, 1944 |